United States Patent
Koh et al.

(10) Patent No.: US 8,087,070 B2
(45) Date of Patent: Dec. 27, 2011

(54) PREDICTIVE METHOD FOR MULTI-PARTY STRENGTHENING OF AUTHENTICATION CREDENTIALS WITH NON-REAL TIME SYNCHRONIZATION

(75) Inventors: Eng-Kiat Koh, Foster City, CA (US); Mok Ku, Foster City, CA (US); Chee Meng Low, Singapore (SG); Peng T. Ong, Clyde Hill, WA (US)

(73) Assignee: International Business Machines Corporation, Armonk, NY (US)

( * ) Notice: Subject to any disclaimer, the term of this patent is extended or adjusted under 35 U.S.C. 154(b) by 1217 days.

(21) Appl. No.: 11/133,170

(22) Filed: May 18, 2005

(65) Prior Publication Data

US 2006/0080729 A1    Apr. 13, 2006

(30) Foreign Application Priority Data

Oct. 13, 2004   (SG) ................. 200406250-1

(51) Int. Cl.
*G06F 7/04* (2006.01)
*H04L 29/06* (2006.01)
*H04L 9/32* (2006.01)
*G06F 21/00* (2006.01)

(52) U.S. Cl. .................. 726/5; 726/3; 726/4; 713/150; 713/168; 713/170; 713/182; 713/184

(58) Field of Classification Search ............... 726/2–9, 726/16–21; 713/150, 164–168, 170, 182–185; 340/5.54, 5.74, 5.8, 5.85; 707/781–788; 709/217, 219, 229

See application file for complete search history.

(56) References Cited

U.S. PATENT DOCUMENTS

| | | | | |
|---|---|---|---|---|
| 4,885,778 A * | 12/1989 | Weiss | | 713/184 |
| 5,592,553 A * | 1/1997 | Guski et al. | | 713/159 |
| 6,553,494 B1 * | 4/2003 | Glass | | 713/186 |
| 6,769,068 B1 * | 7/2004 | Brozowski et al. | | 726/5 |
| 6,877,095 B1 * | 4/2005 | Allen | | 713/182 |
| 6,889,209 B1 * | 5/2005 | Rabin et al. | | 705/57 |
| 6,988,210 B1 * | 1/2006 | Audebert | | 726/9 |
| 7,150,038 B1 * | 12/2006 | Samar | | 726/8 |
| 2001/0037469 A1 * | 11/2001 | Gupta et al. | | 713/202 |
| 2002/0073213 A1 * | 6/2002 | Mekata et al. | | 709/229 |

(Continued)

FOREIGN PATENT DOCUMENTS

WO    WO01/01224 A1    1/2001

OTHER PUBLICATIONS

U.S. Appl. No. 60/546,194.*

(Continued)

*Primary Examiner* — Nirav B Patel
*Assistant Examiner* — Darren B Schwartz
(74) *Attorney, Agent, or Firm* — Francis Lammes; Stephen J. Walder, Jr.; Jeffrey S. LaBaw

(57) ABSTRACT

A method and system for strengthening authentication credentials for accessing any number of applications across multiple access interfaces and across multiple remote access sites is disclosed. The applications can be accessed by a set of authorized users by using multiple instances of a predictive scheme for generating and synchronizing the authentication credentials and by leveraging pre-existing infrastructure associated with the applications.

21 Claims, 5 Drawing Sheets

U.S. PATENT DOCUMENTS

| | | | |
|---|---|---|---|
| 2002/0083328 A1* | 6/2002 | Riordan | 713/183 |
| 2003/0182551 A1 | 9/2003 | Frantz et al. | |
| 2003/0219129 A1* | 11/2003 | Whelan et al. | 380/270 |
| 2004/0093515 A1 | 5/2004 | Reeves, Jr. | |
| 2004/0181687 A1* | 9/2004 | Nachenberg et al. | 713/201 |
| 2007/0050635 A1* | 3/2007 | Popp | 713/185 |

OTHER PUBLICATIONS

International Search Report and Written Opinion, International Application No. PCT/SG2005/000077, Oct. 11, 2005, 10 pages.

* cited by examiner

Pre-define a function for predicting credentials to be used for authenticating users who are attempting to access a system
102

Instantiate multiple instances of the defined predictive function in various components in the system
104

Use at least one of the instantiations for updating a credentials store in the system
106

Use at least one of the instantiations as a credentials verifier in cases where on-demand verification is desired
108

FIG. 1

PREDICTIVE METHOD FOR MULTI-PARTY STRENGTHENING OF AUTHENTICATION CREDENTIALS WITH NON-REAL TIME SYNCHRONIZATION

CROSS REFERENCE TO RELATED APPLICATIONS

Priority of Singapore patent application no. 200406250-1, filed on Oct. 13, 2004 is claimed under 35 U.S.C. §0.119.

TECHNICAL FIELD

The present invention is directed to system security, and more specifically to strengthening authentication credentials for accessing any number of applications across multiple access interfaces and across multiple remote access sites. The applications can be accessed by a set of authorized users by using multiple instances of a predictive scheme for generating and synchronizing the authentication credentials and by leveraging existing infrastructure associated with the applications.

BACKGROUND

One approach to enhancing security in enterprise systems and other computer systems is to add several layers of security to the system. For example, authentication of a user may be required not only when logging into the system but also when accessing each application in the system. A separate authentication is required for accessing each application.

However, even if authentication mechanisms are in place to restrict access to applications, such mechanisms often involve weak credentials. An example of weak credentials is a password that is easy to crack. Strong authentication is often required to satisfy regulation and/or to mitigate risk.

One approach is to implement password policies to enforce password strength and change frequency. However, users often forget strong passwords, and find frequent password changes inconvenient. Further, users often compromise security by writing down their passwords.

In another approach, password management systems can be implemented to generate and update random passwords automatically. However, if a user logs in from an access point where the password management system has not been implemented, then the user is locked out from accessing the desired application. Another problem with such random password management systems is that the user must obtain the latest random password. A user may not be able to obtain a synchronized password if the user is offline or if the user is otherwise unable to contact the required servers that manage the passwords. Further, such password management systems are incompatible with standalone hardware password generators because such hardware password generators are unable to discover or synchronize with the latest random passwords managed by the password management system.

In yet another approach, one-time password (OTP) generators may be used to secure access to applications. OTP generators obviate the need for users to remember the password or change the password. However, if a user is not is possession of the OTP generator, the user faces a lock out. Moreover, application servers are not typically equipped to authenticate OTP generated passwords. The application server needs to redirect the authentication procedure to a separate OTP server for authentication of the OTP generated password. However, not all applications support redirection. Further, multiple applications share the same authentication directory. To enforce OTP on the directory will require all the applications using the directory to be modified to support OTP in the front end. In addition, OTP solutions do not easily support offline login. In contrast, most applications support offline login. Offline login is a requirement for most users. Most applications support offline verification of credentials when the server is not contactable. OTP requires redirection, and therefore requires network connectivity. Thus, OTP solutions are unable to run offline.

In view of the foregoing, there is a need for a method and system for strengthening authentication credentials adapted for accommodating multi-party, multi-access points across a plurality of applications while leveraging pre-existing authentication mechanisms that are already associated with the applications.

BRIEF DESCRIPTION OF THE DRAWINGS

FIG. 1 is a flow chart that illustrates some aspects of certain embodiments.

DETAILED DESCRIPTION

According to one aspect of certain embodiments, authentication credentials for accessing applications can be strengthened by having multiple components that are capable of managing the authentication credentials needed to access a given application. Such components are herein referred to as credential mechanisms. According to one aspect of an embodiment, credential mechanisms can predict sequences of authentication credentials based on a pre-defined predictive method. The multiple credential mechanisms use the same pre-defined predictive method. In other words, an instance of the pre-defined predictive method is instantiated on each of the credential mechanisms. Changes in the predictive method are propagated to all credential mechanisms so that all credential mechanisms are synchronized.

Further, according to another aspect, some of the credentials mechanisms are further adapted for updating authentication directories that are used by the applications to authenticate credentials received from users who are attempting to access a given application. Such credential mechanisms are also referred to as predictive credential updaters. Optionally, some of the credentials mechanisms are further adapted for dynamically verifying the sequence of credentials received from users. Such credential mechanisms are also referred to as predictive credential verifiers. According to certain embodiments, a credential mechanism may be capable of being both a credential updater and a credential verifier depending on the needs of the secure system.

According to yet another aspect of certain embodiments, the pre-defined predictive method can be instantiated on pre-existing authentication mechanisms used in a given secure network or used to protect a given set of applications in a network. Thus, pre-existing secure systems can be modified to implement embodiments of the invention, if so desired.

Alternatively, embodiments of the invention can be implemented at inception of a new system.

Further, according to another aspect of certain embodiments, the pre-defined predictive method may be based on any function that is difficult to invert, such as a one-way hash, for example. According to certain embodiments, such a function has pre-defined parameters that are known to all the credential mechanisms in the system.

Figure 2:
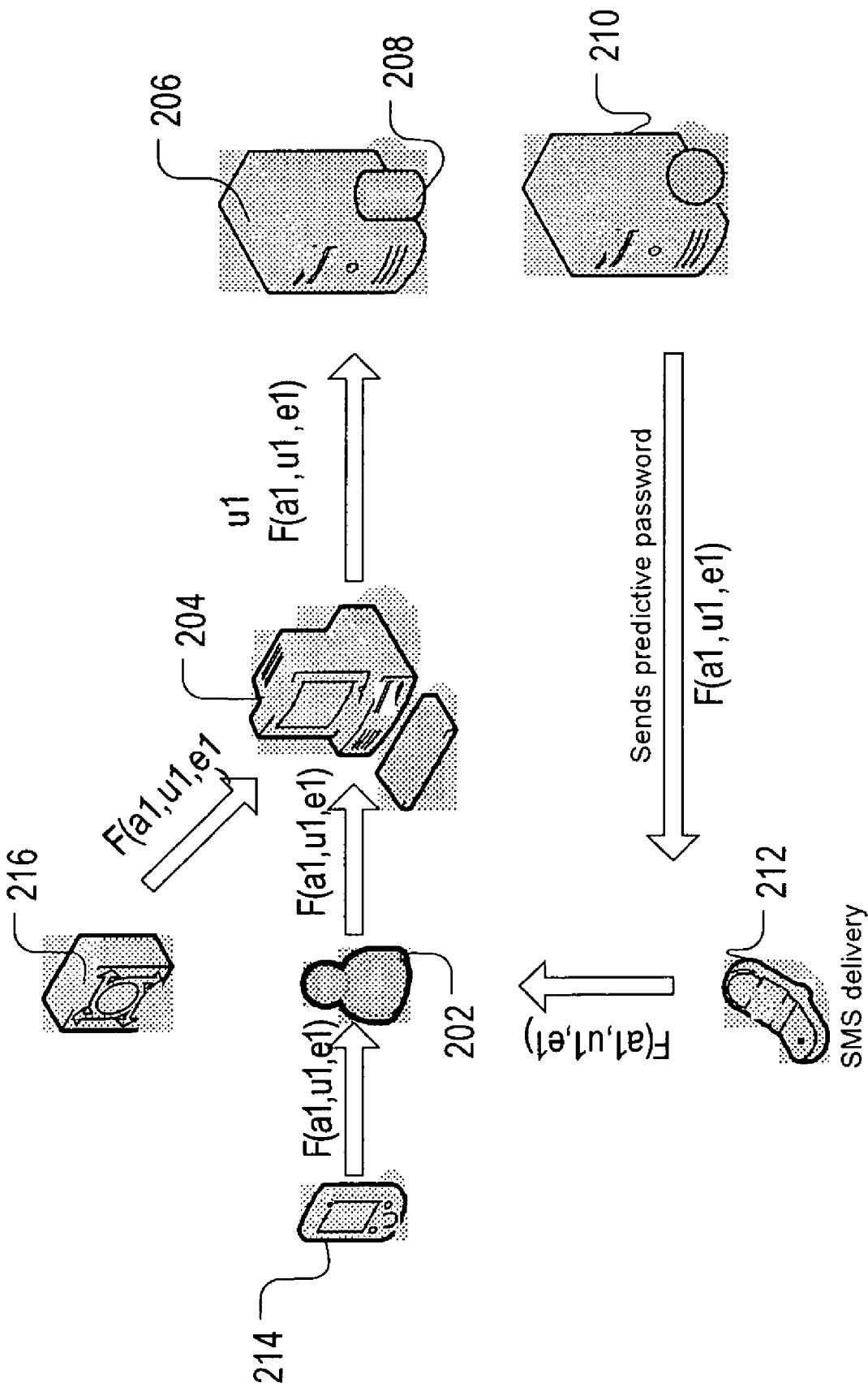
FIG. 2 is a block diagram that illustrates the efficacy of instantiating the defined and agreed upon predictive function for predicting credentials in multiple components of the system.
Figure 3:
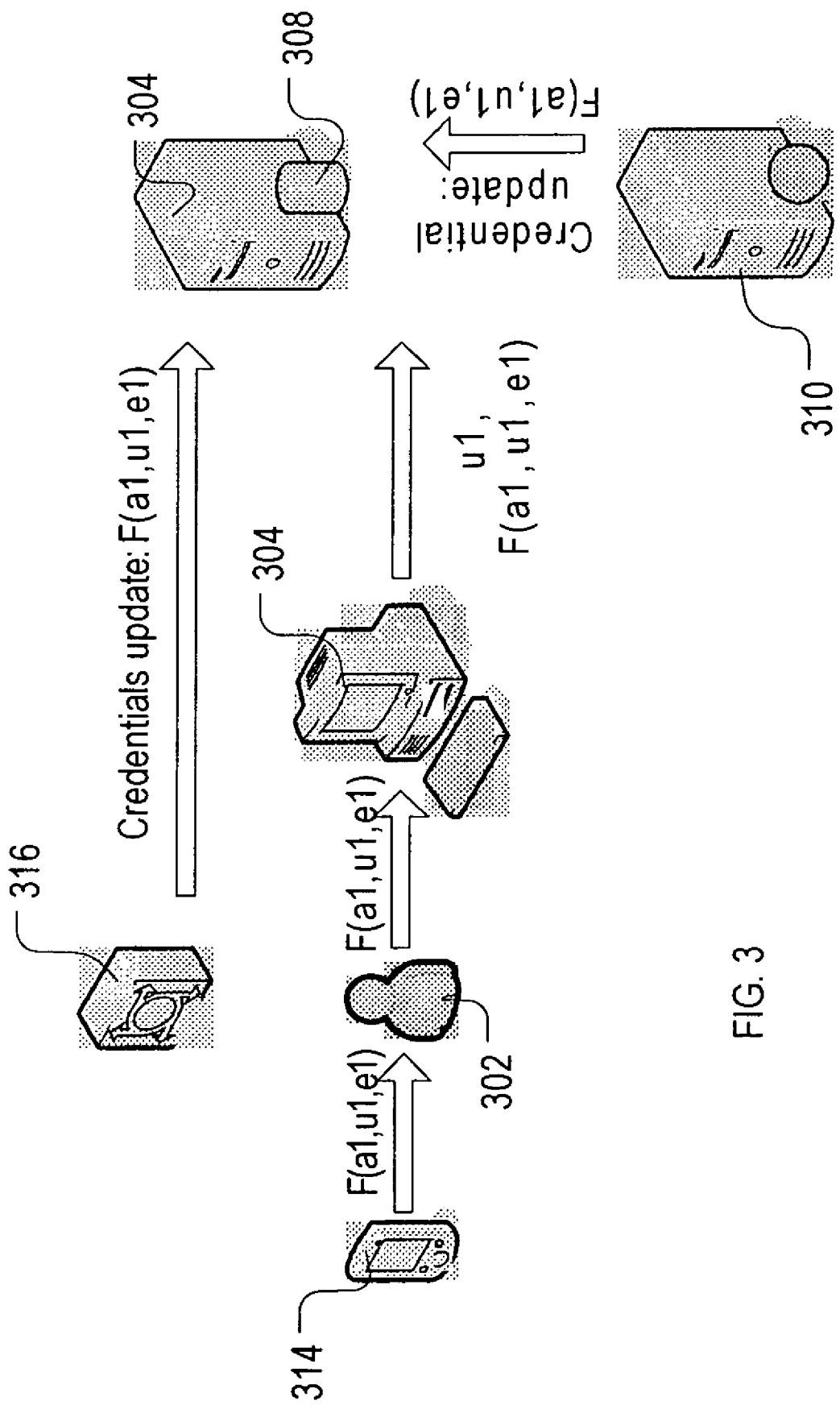
FIG. 3 is a block diagram that illustrates non-real time updating of user password stores in the secure system.
Figure 4:
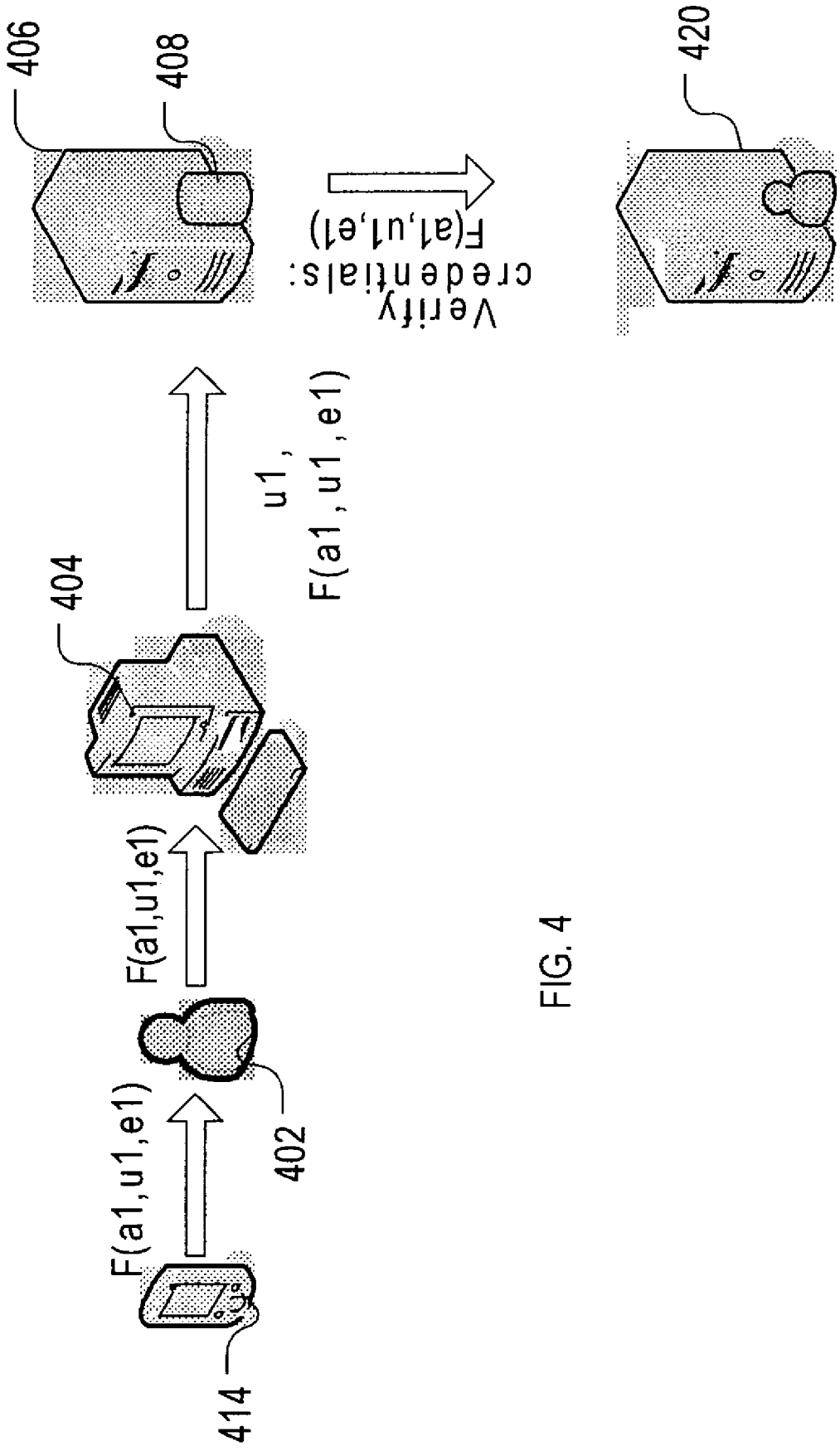
FIG. 4 is a block diagram that illustrates a secure system that includes a predictive credential verifier for verifying passwords in real-time.

FIG. 1 is a flow chart that illustrates some aspects of certain embodiments. FIG. 1 is described with reference to FIG. 2, FIG. 3 and FIG. 4. FIG. 2, FIG. 3 and FIG. 4 are block diagrams that illustrate how different components work in a system in which an embodiment is implemented.

At block 102 of FIG. 1, a function for predicting credentials to be used for authenticating users who wish to access applications on the system is selected. The function for predicting credentials can be based on the user's identity, the application that the user wishes to access and the agreed-upon periodic event, such as time of day. The function for predicting credentials is described in greater detail herein with reference to FIG. 5.

At block 104, once the predictive function of block 102 is defined, multiple instances of the predictive function are instantiated in several components in the system. As illustrative and non-limiting examples, the defined predictive can be instantiated on a user's PDA (PDA 214 of FIG. 2), on the user's personal computer (PC 204 and software 216 of FIG. 2), on a server-based credentials updater (credentials updater 310 of FIG. 3), on a web-based credentials generator (credentials generator 210 of FIG. 2), on a credentials verifier (credentials verifier 420 of FIG. 4).

At block 106 of FIG. 1, at least one instantiation of the predictive function (updater 216 of FIG. 2 and updater 310 of FIG. 3) is used for updating the credentials store in the system, such as an application user store or directory (store or directory 208 of FIG. 2). Credential updaters are described in greater detail herein with reference to FIG. 2 and FIG. 3.

At block 108, at least one instantiation of the predictive function is used as a credentials verifier (verifier 420 of FIG. 4) in cases where on-demand verification is desired. On-demand verification is described in greater detail herein with reference to FIG. 4.

FIG. 2 is a block diagram that illustrates the efficacy of instantiating the defined and agreed upon predictive function of block 102 of FIG. 1 in multiple components of the system. One or more of such components are optional. FIG. 2 shows a user 202, user's computer 204, a software implemented credentials generator 216, an application server 206, an application user store or directory 208, a web-based credentials generator 210, a cellular phone 212, and a hardware credentials generator such as a PDA or custom token 214. In FIG. 2, user 202 does not need to memorize the password (credentials) needed to gain access to a given application a1 on the system. User 202 can use the password generated by PDA 214 since the predictive function is instantiated on PDA 214. User 202 would login to his hardware credentials generator (PDA generator or custom token 214) by entering the user's PIN. The user's PIN would reveal the user's identity to the hardware credentials generator. User 202 may indicate to the hardware credentials generator, the desired application (a1) into which he wishes to login. The hardware credentials generator can be adapted to pick up the time of day. Thus, the hardware credentials generator has the parameters for predicting the password using the predictive function that is previously instantiated in the hardware credentials generator. User 202 then manually inputs the password generated by PDA 214 in an authentication interface for accessing application a1. The input password is then sent to application server 206. The input password received at application server 206 is authenticated against the corresponding password in user password directory 208. User password directory 208 has been updated with the latest passwords in a non-real time manner by a credentials updater, as described in greater detail herein with reference with FIG. 3.

Alternatively, user 202 may use a web browser on computer 204 to communicate with web-based credentials generator 210. For example, user 202 may tell web-based credentials generator 210 to generate the password needed for accessing application a1. In response, web-based credentials generator 210 can generate the password much in the same manner as the hardware credentials generator 214 and send the password to user 202 via the user's browser or by SMS delivery via cellular phone 212, for example. User 202 then manually inputs the password generated by web-based credentials generator 210 in an authentication interface for accessing application a1.

Optionally, user 202 may rely on software implemented credentials generator 216 installed on computer 204 to generate the password required to access application a1. The software implemented credentials generator 216 can generate the password based on the user's identity, the identity of the application that the user wishes to access and the value of the agreed-upon periodic event. In certain embodiments, the software implemented credentials generator 216 may be adapted to auto-detect the application that the user is attempting to access. In other embodiments, the software implemented credentials generator 216 may be adapted to auto-detect the user's identity in addition to auto-detecting the application that the user is attempting to access.

Based on the prior knowledge of a given user's identity, the identity of the application that the user wishes to access and the value of the agreed-upon periodic event, the multiple credential generators can remain in sync without real-time synchronization. Thus, multiple predictive credential generators may be deployed easily without the need for real time synchronization. User 202 can thereby avail himself of login assistance provided by any of the plurality of credential generators for accessing a given application.

FIG. 3 is a block diagram that illustrates non-real time updating of user password stores in the secure system. FIG. 3 shows a user 302, user's computer 304, a software implemented credentials updater 316, an application server 306, an application user password store or directory 308, a server-based credentials updater 310, and a hardware credentials generator such as a PDA or custom token 314. A predictive credentials updater, such as software implemented credentials updater 316 and server-based credentials updater 310, is used for updating the user password store in non-real time. By updating the user password store with the latest passwords in non-real time, the user password store is able to authenticate credentials that are input by authorized users who wish to access applications maintained by application server 306.

A predictive credentials updater is a credentials generator with the additional function of updating credential stores associated with a given application. To explain, the predictive credentials updater has a list of authorized users and a list of the applications that each user is authorized to access. The predictive credentials updater then determines ahead of time all the passwords needed by each user to access each of the applications on the list corresponding to all values of the agreed-upon periodic event (the hour of the day, for example). The predictive credentials updater then updates the credentials store associated with each given application by writing into the credentials store all the passwords that the predictive credentials updater had predicted ahead of time. Thus, the credentials store associated with a given application will have non-real time updated knowledge of all the passwords needed for authenticating input passwords sent by users who are attempting to login into applications. In other words, the credential store will have knowledge of the passwords needed for authentication well before the user inputs his passwords for logging into a desired application.

Predictive credentials updaters can use existing interfaces provided by the applications. Thus, minimal infrastructure changes are needed. Users continue to use existing login interfaces for each application.

The non-real time synchronization aspect of predictive credential generators and updaters is amenable to scalability. Multiple predictive credentials updaters can be deployed in the system because predictive credential updaters (and generators) are idempotent in that credentials stored in the credential stores can be overwritten. Overwriting of credentials is not a concern because the predictive credential updaters (and generators) in the system are instantiated with the same predictive function and so will generate identical sets of passwords corresponding to the set of authorized users, applications and agreed-upon periodic event.

According to certain embodiments, a predictive credential updater may be of the type that effects credential update through a server-side credential update interface. An illustrative and non-limiting example is that a predictive credential updater on the server side may use the lightweight directory access protocol (LDAP) password interface to effect a password update.

According to some embodiments, a predictive credentials updater may be of the type that effects credential update through a client-side credential update interface. For example, a predictive credential updater on the client-side may be adapted to automate a click-through sequence that is required for a client-side password change. To illustrate, a client-side predictive credential updater may post a password change using an html form for web-based applications. As another illustration, a client-side predictive credential updater may generate desktop events that, in turn, effect a manual click-through of a desktop program to effect a password change.

In some other embodiments, the application that is to be protected by a password can be modified to provide an interface that a predictive credential updater may call to effect a password (credential) update.

Not all applications require a predictive credentials updater. Application servers that support redirection may use a predictive credentials verifier for verifying predictive passwords on demand.

FIG. 4 is a block diagram that illustrates a secure system that includes a predictive credential verifier for verifying passwords in real-time. FIG. 4 shows a user 402, user's computer 404, an application server 406, an application user password store or directory 408, and a predictive credentials verifier 420.

The predictive credential verifier is an optional component of the system. The predictive credential verifier obviates the need for predictive credential updaters because of the verifier's ability to authenticate credentials on demand. Predictive credential verifiers are best suited for applications that support redirection of authentication procedures to a separate authenticating system such as the predictive credentials verifier. Predictive credential verifiers are also suitable for networks that can ill afford the extra load generated by predictive credentials updaters. When logging in, a user selects her desired application, and enters her username, and password.

The predictive credentials verifier, like the predictive credentials generator and updater, either has knowledge of the current event or is capable of obtaining knowledge of the current event. The verifier can then regenerate the user's password based on the username, selected application and the current event. The verifier authenticates the login password inputted by the user by comparing the login password with the regenerated password.

Figure 5:
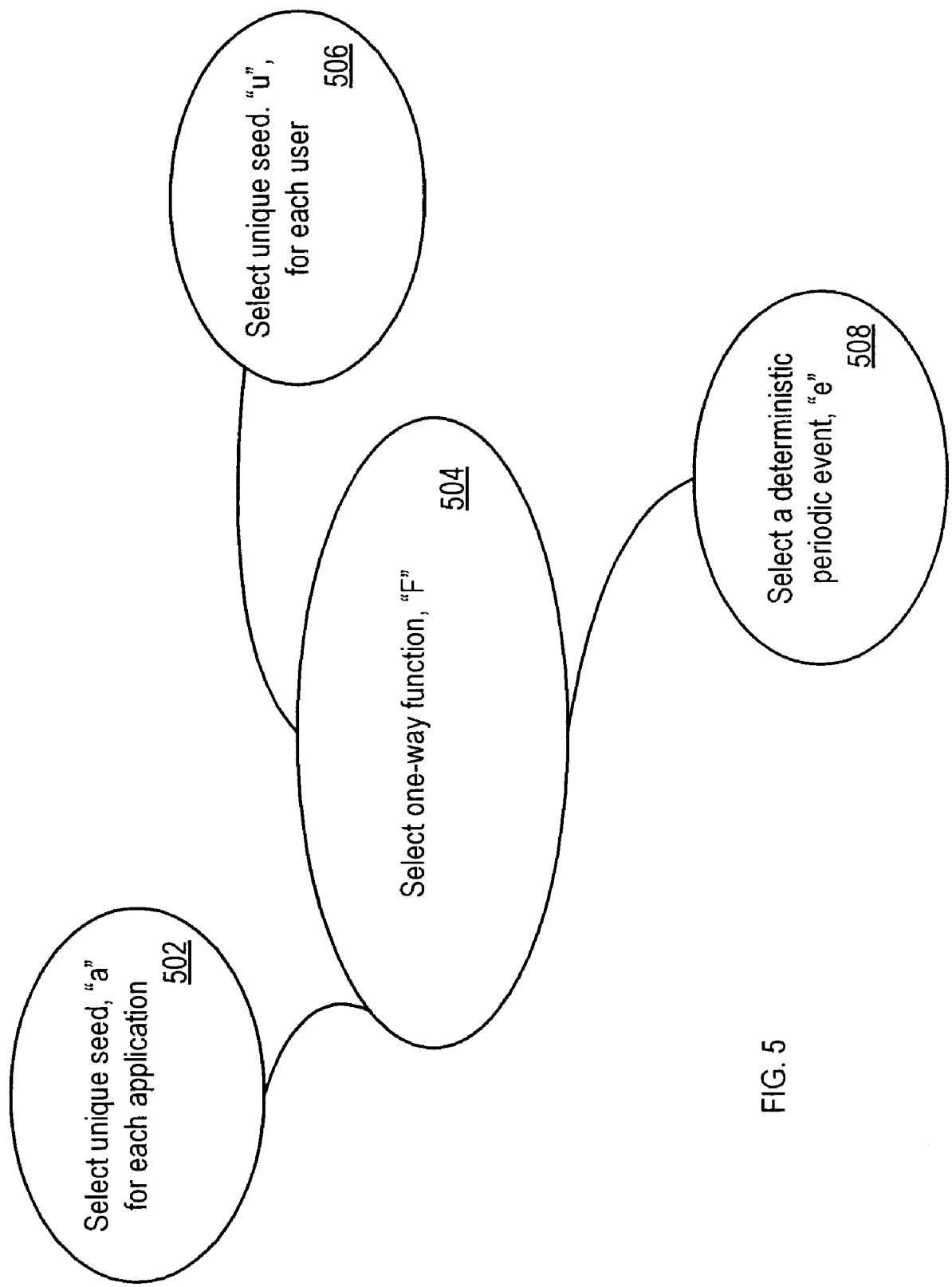
FIG. 5 is a block diagram that illustrates aspects of a predictive function, according to certain embodiments.

FIG. 5 is a block diagram that illustrates aspects of a predictive function, according to certain embodiments. The tasks illustrated in FIG. 5 are not restricted to any particular order. At block 504, a one-way function, "F", that is difficult to invert is selected. F has the arguments "a" "u" and "e". A non-limiting example of F is a one-way hash. At block 502, a seed "a" that is unique to each application for which credentials are to be generated is selected. At block 506, a seed "u" that is unique to each user for whom credentials are to be generated is selected. At block 508, an agreed-upon deterministic and periodic event "e" is selected. Non-limiting examples of "e" are the minute of day, the hour of day, the day of week, the day of month or some agreed upon data (with periodicity) present in a particular file that is accessible by the deployed credential generators, updaters and verifiers. Another non-limiting example of "e" may be a complex business rule such as "midnight on the last day of each calendar month."

In certain embodiments, F(a,u,e) may employ a common "a" seed across all applications but "u" remains unique to each user. In certain other embodiments, F(a,u,e) may employ a common "u" across all applications but "a" remains unique to each application. Such a credential may be further strengthened by requiring an additional PIN unique to each user.

Generators, updaters and verifiers may also automatically generate credentials corresponding to F(a,u,e−1) and F(a,u,e+1) to cover boundary conditions. To explain, assume that a user "u1", attempts to access application "a1" at time "e". Further assume that at the time of user u's attempt, a credentials updater has only updated the credentials store with credential F(a,u,e−1). The user's credential generator will automatically generate credential F(a,u,e−1) in order to match the credential in the credentials store.

In the foregoing specification, embodiments of the invention have been described with reference to numerous specific details that may vary from implementation to implementation. It will be evident that various modifications and changes may be made thereto without departing from the broader spirit and scope of the invention. The specification and drawings are, accordingly, to be regarded in an illustrative rather than a restrictive sense.

We claim:

1. A method, in an application server, for providing a set of authorized users secure access to a plurality of applications, the method comprising:

responsive to receiving, by a server credentials generator in a plurality of credential mechanisms, a user's identity of a user in the set of authorized users, an identified application from a set of applications in the plurality of applications that are accessible by the user, and a password, identifying, by the server credentials generator, a current event, an event preceding the current event, and an event succeeding the current event, from a set of periodic events;

retrieving, by the server credentials generator, a set of stored passwords from a credentials store, wherein a first stored password within the set of stored passwords is associated with the identified application, the user's identity, and the current event, wherein a second stored password within the set of stored passwords is associated with the identified application, the user's identity, and the event preceding the current event, and wherein a third stored password within the set of stored passwords is associated with the identified application, the user's identity, and the event succeeding the current event;

responsive to the password matching the first stored password associated with the current event, granting, by the server credentials generator, access to the identified application;

responsive to the password failing to match the first stored password associated with the current event, determining, by the server credentials generator, whether the password matches either the second stored password associated with the event preceding the current event or the third stored password associated with the event succeeding the current event; and responsive to either the password matching the second stored password associated with the event preceding the current event or the third stored password associated with the event succeeding the current event, granting, by the server credentials generator, access to the identified application.

2. The method of claim 1, further comprising:
responsive to receiving, by a credentials verifier in the plurality of credential mechanisms, the user's identity, the identified application from the set of applications, and the password, identifying, by the credentials verifier, the current event from the set of periodic events;
generating, by the credentials verifier, a regenerated password using a predictive scheme in the set of predictive schemes based upon the identified application, the current event, and the identity of the user; and
responsive to the password matching the regenerated password, granting, by the credentials verifier, access to the identified application.

3. The method of claim 1, further comprising:
generating, by a credential updater in the plurality of credential mechanisms, a set of passwords for the user to access the set of applications, wherein the set of passwords comprises a password for each combination of each application in the set of applications, each event in the set of periodic events, and the user's identity; and
storing, by the credential updater, the set of passwords in a credentials store.

4. The method of claim 1, wherein the plurality of applications are accessible through a plurality of different access interfaces using generated authentication credentials corresponding to each application being accessed.

5. The method of claim 1, wherein the plurality of applications are accessible from a plurality of different remote sites and computers.

6. The method of claim 1, wherein the plurality of credential mechanisms are embodied in any device from a set of devices comprising:
a PDA;
a phone;
a web server;
a server;
a personal computer; and
a handheld device.

7. The method of claim 1, wherein each predictive scheme in the set of predictive schemes includes using a difficult to invert one-way function with arguments that include a first seed that is unique to each application of the plurality of applications, a second seed that is unique to each user authorized to access the plurality of applications, and a third seed that is unique to an agreed upon event in the set of periodic events.

8. The method of claim 7, further comprising:
applying a one-way hash to the one-way function.

9. An authentication system, the authentication system comprising:
a processor; and
a memory coupled to the processor, wherein the memory comprises instructions which, when executed by the processor, cause the processor to:
responsive to receiving a user's identity of a user in a set of authorized users, an identified application from a set of applications in a plurality of applications that are accessible by the user, and a password, identify a current event, an event preceding the current event, and an event succeeding the current event, from a set of periodic events;
retrieve a set of stored passwords from a credentials store, wherein a first stored password within the set of stored passwords is associated with the identified application, the user's identity, and the current event, wherein a second stored password within the set of stored passwords is associated with the identified application, the user's identity, and the event preceding the current event, and wherein a third stored password within the set of stored passwords is associated with the identified application, the user's identity, and the event succeeding the current event;
responsive to the password matching the first stored password associated with the current event, grant access to the identified application;
responsive to the password failing to match the first stored password associated with the current event, determine whether the password matches either the second stored password associated with the event preceding the current event or the third stored password associated with the event succeeding the current event; and
responsive to either the password matching the second stored password associated with the event preceding the current event or the third stored password associated with the event succeeding the current event, grant access to the identified application.

10. The authentication system of claim 9, wherein the pre-selected predictive scheme includes a difficult to invert one-way function with arguments that comprises a first seed that is unique to each application of the plurality of applications, a second seed that is unique to each user authorized to access the plurality of applications, and a third seed that is unique to an agreed upon deterministic event in the set of periodic events.

11. The authentication system of claim 9, wherein the instructions further cause the processor to:
responsive to receiving the user's identity, the identified application from the set of applications, and the password, identify the current event from the set of periodic events;
generate a regenerated password using a predictive scheme in the set of predictive schemes based upon the identified application, the current event, and the identity of the user; and
responsive to the password matching the regenerated password, grant access to the identified application.

12. The authentication system of claim 9, wherein the plurality of applications are accessible through a plurality of different access interfaces using authentication information corresponding to each application being accessed.

13. The authentication system of claim 9, wherein the plurality of applications are accessible from a plurality of different remote sites and computers.

14. The method of claim 1, wherein the agreed upon event is at least one of a minute of a day, a hour of the day, the day of a week, or the day of the month.

15. The authentication system of claim 9, wherein the instructions further cause the processor to:
generate a set of passwords for the user to access the set of applications, wherein the set of passwords comprises a password for each combination of each application in the set of applications, each event in the set of periodic events, and the user's identity; and
store the set of passwords in a credentials store.

16. The authentication system of claim 10, wherein the instructions further cause the processor to:
apply a one-way hash to the one-way function.

17. The authentication system of claim 9, wherein the agreed upon deterministic event is at least one of a minute of a day, a hour of the day, the day of a week, or the day of the month.

18. The method of claim 1, wherein the set of periodic events are agreed upon by the user.

19. The authentication system of claim 9, wherein the set of periodic events are agreed upon by the user.

20. The method of claim 1, further comprising:
responsive to receiving, in a credentials generator in the plurality of credential mechanisms, the user's identity;
identifying, by the credentials generator, the set of applications;
identifying, by the credentials generator, the set of periodic events;
generating, by the credentials generator, a set of predictive schemes using a combination of each application in the set of applications, each event in the set of periodic events, and the user's identity; and
instantiating, by the credentials generator, the set of predictive schemes on the plurality of credential mechanisms in the application server.

21. The authentication system of claim 9, wherein the instructions further cause the processor to:
receive the user's identity;
identify the set of applications;
identify the set of periodic events;
generate a set of predictive schemes using a combination of each application in the set of applications, each event in the set of periodic events, and the user's identity; and
instantiate the set of predictive schemes on the plurality of credential mechanisms in the authentication system.

* * * * *